April 10, 1962 M. BUD 3,029,120

RECORDING DEVICES

Filed Nov. 20, 1959 6 Sheets-Sheet 1

Inventor
MARTIN BUD
By Leon M. Strauss
Att.

April 10, 1962 M. BUD 3,029,120

RECORDING DEVICES

Filed Nov. 20, 1959 6 Sheets-Sheet 2

Inventor
MARTIN BUD
By Leon M. Straus
Agt.

Inventor
MARTIN BUD
By [signature]
Agt.

April 10, 1962 M. BUD 3,029,120

RECORDING DEVICES

Filed Nov. 20, 1959 6 Sheets-Sheet 4

Inventor
MARTIN BUD
By
Agt.

April 10, 1962 M. BUD 3,029,120

RECORDING DEVICES

Filed Nov. 20, 1959 6 Sheets-Sheet 5

Inventor
MARTIN BUD
By [signature] AGT.

April 10, 1962

M. BUD 3,029,120

RECORDING DEVICES

Filed Nov. 20, 1959

6 Sheets-Sheet 6

Inventor
MARTIN BUD
By [signature]
Agt.

United States Patent Office 3,029,120
Patented Apr. 10, 1962

3,029,120
RECORDING DEVICES
Martin Bud, 9 Heathgate, London, England
Filed Nov. 20, 1959, Ser. No. 854,357
Claims priority, application Great Britain Dec. 4, 1958
8 Claims. (Cl. 346—50)

The invention relates to recording devices for registering a variable quantity, for example time or temperature, on record cards.

It is an object of the invention to provide a recording device having a plurality of binary marking means automatically settable in dependence on the variation of a variable quantity for providing, on a record card, markings in binary notation which depend on the automatic setting of the said marking means, the said recording device also having a further plurality of manually settable marking means for providing on the said record card further markings which depend on the manual setting of the said further marking means.

It is a further object of the invention to provide such a recording device comprising means for shifting the binary marking means and/or the further marking means relatively to guide means for the record card for providing the markings at different regions of the record card.

It is yet another object of the invention to provide such a recording device, wherein the binary marking means and further marking means comprise punches for punching holes into the record cards.

It is another object of the invention to provide such a recording device in which the punches of the binary marking means and the further marking means are arranged to face opposite sides of a record card when located in position for punching.

It is a still further object of the invention to provide such a recording device comprising a clock for automatically setting the binary marking means in accordance with the efflux of time so that the markings provided on a record card by the said binary marking means indicate times in binary notation. For example, the setting of the marking means may correspond to a count of the minutes of a weak from 0 to 10,080 and may be automatically zeroized at the end of each week. Such a device may be used as a time clock for recording work people's attendances, jobs and the like.

The marking of time in binary notation on a record card facilitates an easy and automatic evaluation of the recorded markings, whereby the danger of mistakes may be avoided or at least reduced, while additional marking means, if provided, may mark the times on the same record card in decimal notation so that the additional markings may be directly read off by a workman from his record card.

It is a further object of the invention to provide such a recording device, wherein the binary marking means and the further marking means each comprise punch-actuating means between which the guide means are movably arranged, the punch actuating means of the further marking means being movable towards and away from the guide means, the punches of the binary marking means and of the further marking means being arranged in the guide means at either side of a pathway for a record card and in cooperative relation to die openings provided in the guide means at either side of said pathway, means being provided for moving the punch-actuating means of the further marking means to engage the punches thereof and to force the same into the respective die openings, means being provided for forcing the guide means with the punches of the binary marking means into engagement with the actuating means of the said binary marking means to force the punches thereof into the respective die openings whereby to punch the record card when present in the pathway, means being provided for returning the punches of the binary marking means, the further marking means and the guide means after operation of the moving means into their initial positions.

The expression "binary notation" as used herein is intended to mean a true binary notation wherein each digit of a number noted has only one of two values, as well as a "binary-coded decimal notation" wherein each digit of the number has one of ten values, and is separately noted in binary notation.

The above and other objects and advantages of the invention will become apparent from the following detailed description of an embodiment of the invention, when read in conjunction with the appended drawings which are given by way of example and in which.

Figure 1:
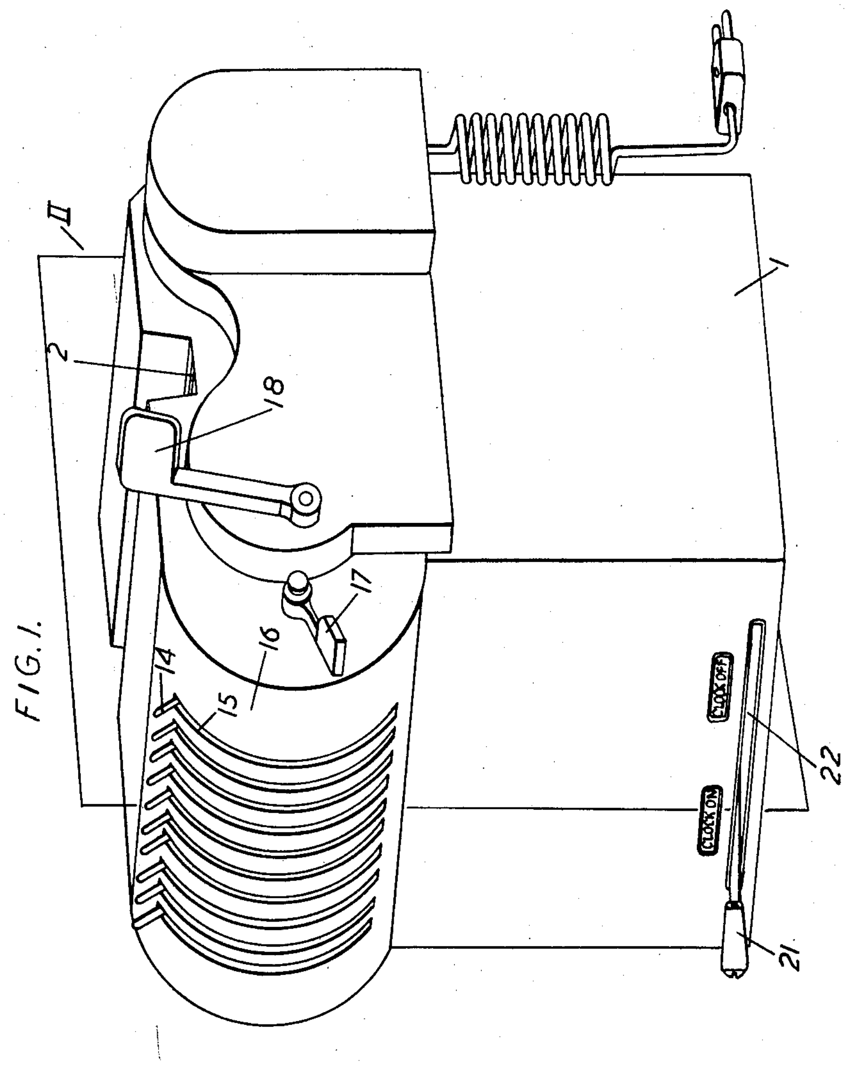
FIG. 1 is a perspective view of a recording device.

The recording device illustrated in the drawings is intended for registering times on record cards to indicate the commencing and finishing times of workpeople's attendances, jobs or the like.

The device comprises a casing 1 (FIGS. 1, 2 and 3) having a slot 2 leading to a pathway 3 between guide means 4 within the casing 1, for receiving a part of a record card 5 (shown separately in FIG. 8) between them when introduced into the pathway 3 through the slot 2. The casing 1 houses binary punch-actuating means, comprising punch-actuating wheels 6, for actuating punches 7 movable in the guide means 4 for providing punchings in binary-coded decimal notation on the record card 5, the said binary punch-actuating wheels 6 being automatically settable by an electrically driven clock mechanism 11 carried by the casing 1 at one side thereof. At the opposite side of the casing 1 an automatic resetting mechanism which can be seen only in FIG. 4 and is there generally indicated by reference numeral 12 is provided for resetting the binary punch-actuating wheels 6 after each period of 10,080 minutes corresponding to one week. The binary punch-actuating wheels 6 are accommodated within the casing 1 at one side of the pathway 3.

At the other side of the pathway 3 ten binary punch-actuating segments 13 are accommodated which are manually settable by ten levers 14 extending through slots 15 in an adjacent wall 16 of the casing 1, each lever 14 extending through one slot 15 and being movable along its slot 15 from a zero position into any one of nine positions so that any number from zero to 9,999,999,999 may be manually set by means of the levers 14. The ten positions 0, 1, 2 . . . 9 for each lever 14 are marked as shown in FIG. 2 on the outside of the casing wall 16 through which the levers 14 extend.

Outside the casing 1, a lever 17 is provided for resetting the settable levers 14 by a single operation into their zero positions. A second lever 18 is provided outside the casing 1 for moving the segments 13 in a direction towards the punch-actuating wheels 6. A third lever 21 extends through another slot 22 in the casing 1 for shifting the punch-actuating wheels 6 perpendicularly to the plane of FIG. 2 so that holes punched by punches 7 appear on the record card 5, which has been shown in FIG. 8, in either field A or field B thereof depending on the setting of the lever 21 so as to easily discriminate between commencing and finishing times, field A corresponding to commencing times and field B to finishing times.

Figure 2:
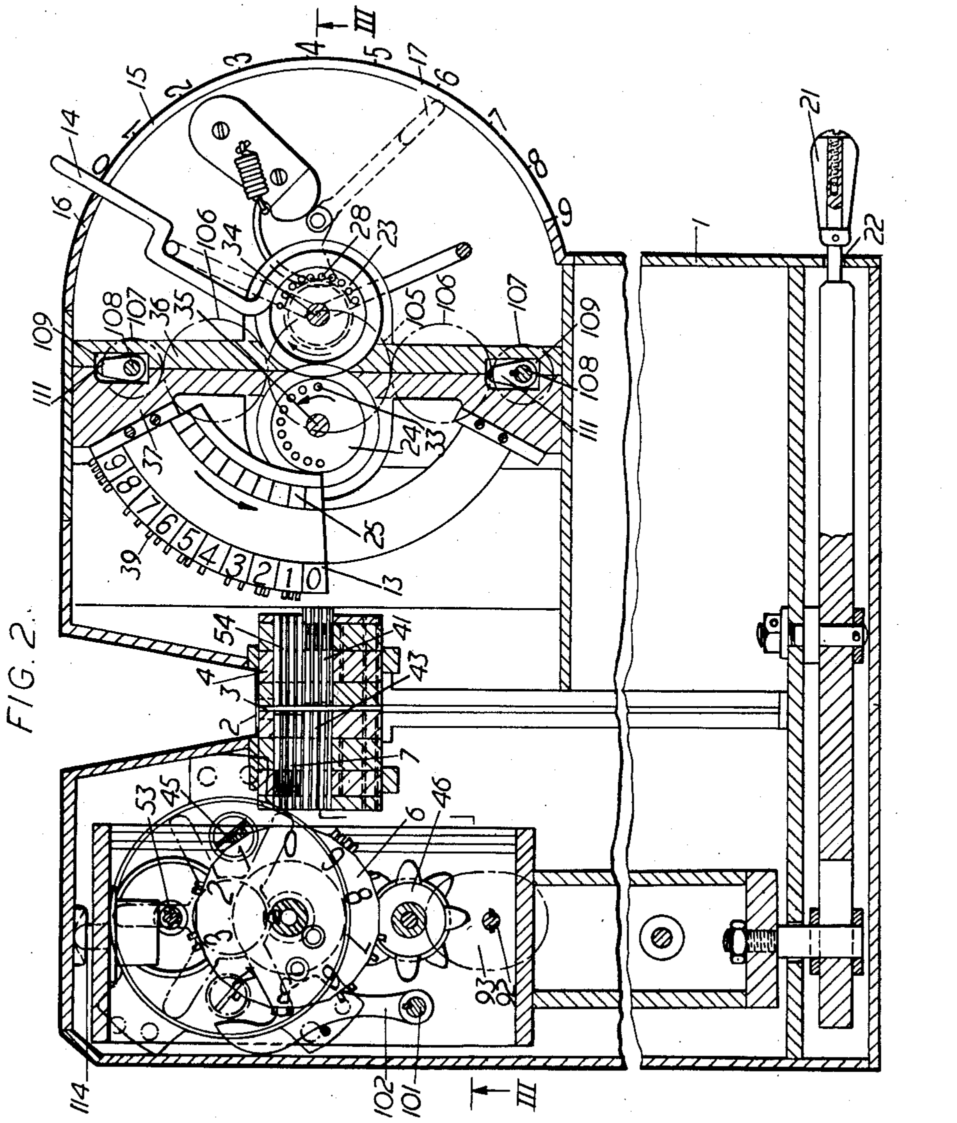
FIG. 2 is a sectional view taken in the plane II of FIG. 1.
Figure 3:
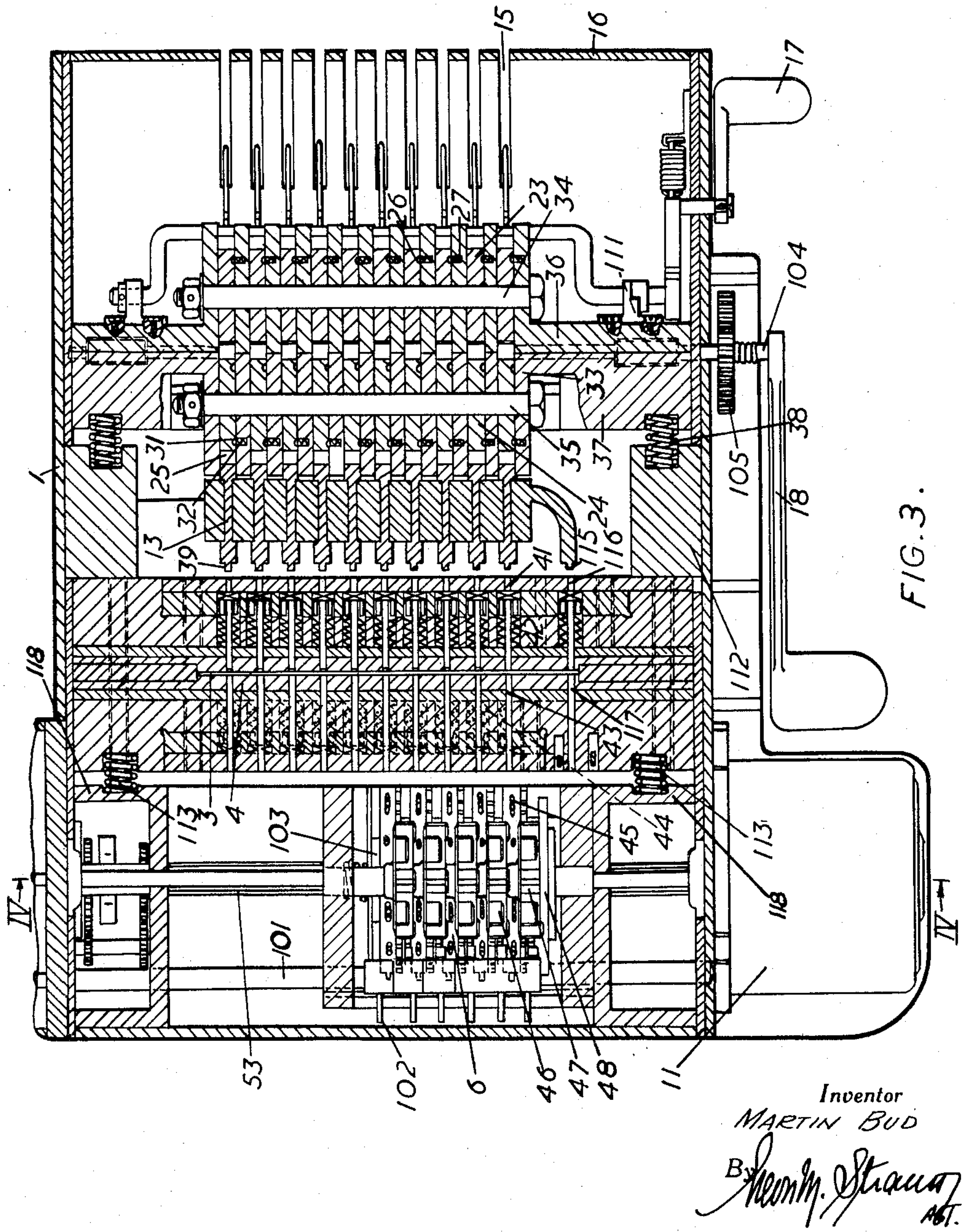
FIG. 3 is a sectional view along the line III—III of FIG. 2.

Each of the setting levers 14 for the punch-actuating segments 13 is connected to a gear wheel 23 shown in FIGS. 2 and 3 so as to rotate the same, the said gear wheel 23 meshing with a second gear wheel 24 which meshes with a toothed quarter segment 25 provided on each punch-actuating segment 13. Each gear wheel 23 is lockable in each of ten positions corresponding to the ten positions of its setting lever 14 by a detent ball 26 urged by a spring 27 into one of ten recesses 28 formed in the gear wheel 23. Each gear wheel 24 is similarly lockable in each of ten positions by a detent ball 31 urged by a spring 32 into one of ten recesses 33. The ten gear wheels 23 are rotatably mounted on a shaft 34 and the ten gear wheels 24 are rotatably mounted on a shaft 35 which extends parallel to the shaft 34. The shaft 34 is mounted on a support 36 which is stationary within the casing 1. The shaft 35 and the segments 25 are mounted on a support 37 which is movable away from the support 36 but is urged towards the support 36 by springs 38.

Figure 7:
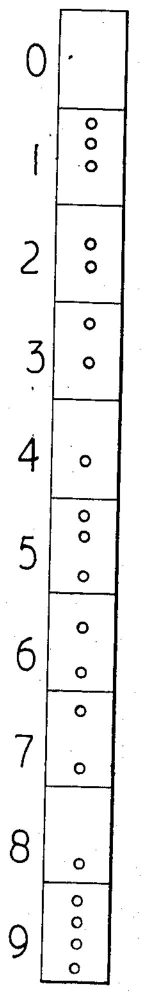
FIG. 7 illustrates in diagrammatic form, developed into a plane, an arrangement of punch-actuating projections on punch-actuating wheels and punch-actuating segments of the recording device.

Each segment 13 has ten fields at its periphery, the fields carrying none, one, two, three or four projections 39 the number and arrangement of which corresponds to a binary coding of the digits 0, 1, 2 . . . 9, the coding being of a form known as —1, —2, 4, 8, as shown diagrammatically in FIG. 7. The segments 13 are arranged adjacent the guide means 4 at one side of the pathway 3 for the record card, the said guide means 4 carrying four punches 41 for each segment 13, each punch 41 being displaceable perpendicularly to the said pathway 3 and being held clear of the said pathway 3 by springs 42. The ends of the punches 41 remote from the said pathway 3 and adjacent the segments 13 are arranged for registering with the projections 39 of the segments 13 corresponding to those digits to which the segments 13 have been set by operating the setting lever 14. When the support 37 with the segments 13 is moved away from the support 36 those punches 41 the ends of which are struck by projections 39 are displaced against the action of the springs 42, so as to pass through the pathway 3 with their other ends, the said other ends entering dies 43 in the guide means 4 at the opposite side of the pathway 3. The punches 41 punch holes in the record card 5 shown in FIG. 8 over the combined breadth of field A and field B.

Figure 4:
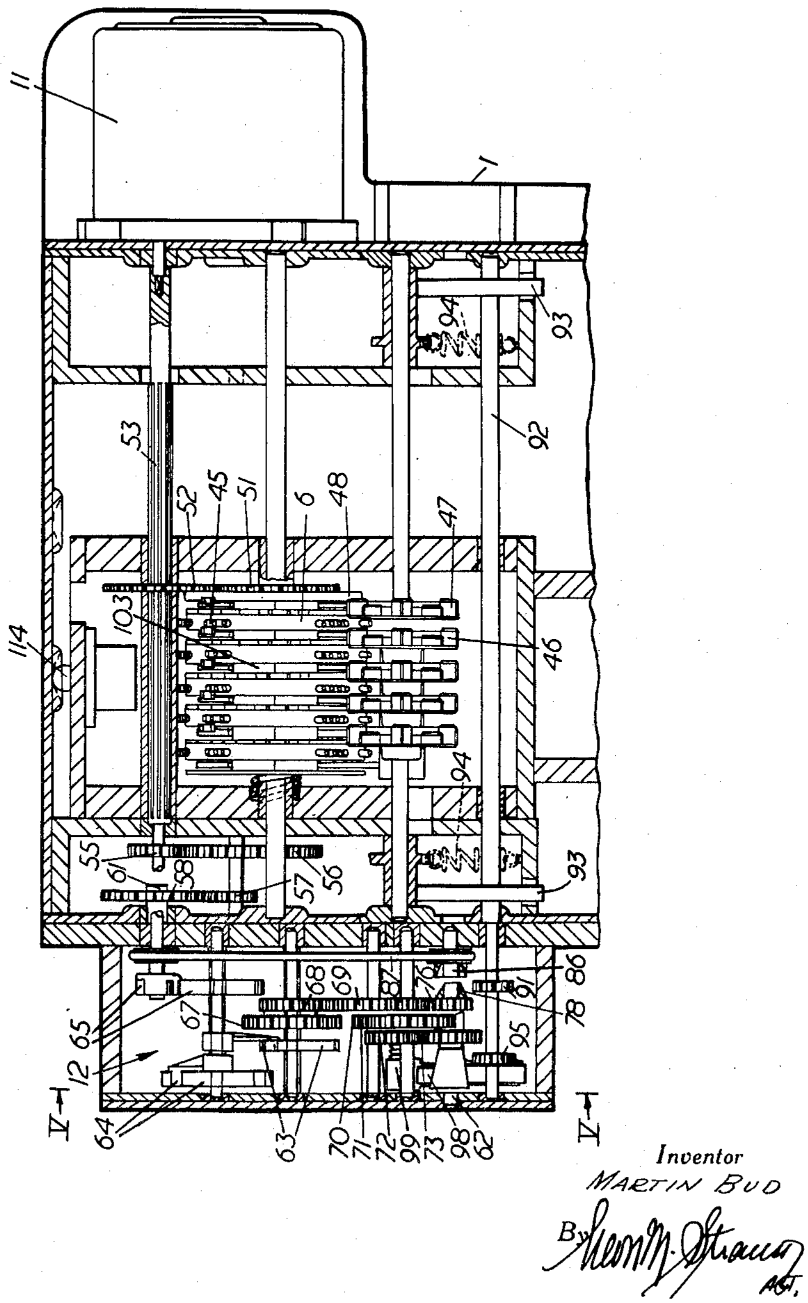
FIG. 4 is a sectional view along the line IV—IV of FIG. 3.

The guide means 4 at the other side of the pathway 3, carry ten sets of four punches 7 each, the punches 7 being held clear of the pathway 3 by springs 44 and being displaceable against the action of the springs 44 by projections 45 arranged on the punch-actuating wheels. Each punch-actuating wheel 6 has on its circumference ten fields, each field carrying none, one, two, three or four projections, the number and arrangement of the projections 45 of each field corresponding to a binary coding of digits 0, 1, 2 . . . 9, the coding being of the form known as —1, —2, 4, 8, as shown diagrammatically in FIG. 7. The punch-actuating wheels 6 are interlinked by known ten transfer mechanisms 46 in the manner of a counting device and are geared to the clock mechanism 11 so that minutes from 0 to 10,080 are counted by the punch-actuating wheels 6. Linked to a first one of the punch-actuating wheels 6 by a known ten transfer mechanism 47 there is provided a time wheel 48 which is similar to the punch-actuating wheels 6 but does not carry any projection 45. The punch-actuating wheels 6 are geared to the clock mechanism 11 by the time wheel 48, which as shown in FIG. 4 carries a gear wheel 51 meshing with a gear wheel 52 axially slideable on a splined shaft 53 driven by the clock mechanism 11. The relationship between the gear wheels 51 and 52 is such that the time wheel 48 performs a single revolution per minute and on completion of each revolution transfers movement through the ten transfer mechanism 47 to the first punch-actuating wheel 6 which moves through 36° and which in turn on the completion of each revolution transfers movement through a tens transfer mechanism 46 to the next punch-actuating wheel and so on. Thus, the punch-actuating wheels 6 are intermittently rotated by the clock mechanism 11 in dependence on the efflux of time, and those projections 45 of the punch-actuating wheels 6 which, at any time, face adjacent ends of punches 7 are indicative of the number of minutes counted from a certain datum or zero time. As previously stated, the punches 7 are movable in the guide means 4, the said guide means 4 being displaceable towards and away from the punch-actuating wheels 6 in a manner to be explained in greater detail further below. Returning now to FIGS. 2 and 3, when the said guide means 4 are displaced towards the punch-actuating wheels 6, projections 45 thereof strike the adjacent ends of punches 7 with which they register and displace the same against the action of the springs 44 so that the other ends of the said punches 7 pass through the pathway 3 and enter dies 54 in the guide means 4 at the now opposite side of the pathway 3.

As can best be seen from FIG. 2, the punches 7 and the dies 54 co-operating therewith are all arranged in the guide means 4 at higher levels than all the punches 41 and the dies 43 co-operating therewith, the punches 7 being arranged at one side, and the punches 41 being arranged at the other side, of the pathway 3. Furthermore, the guide means 4 constrain the punches 7 and 41 to move within their respective levels. By arranging the punches 7 at levels different from those of the punches 41 and by constraining their movements, it has been achieved that the punches 7 at one side of the pathway 3 do not interfere with the punches 41 at the other side of the pathway 3 no matter which particular punches 7 and 41 have been actuated simultaneously in each case.

Figure 5:
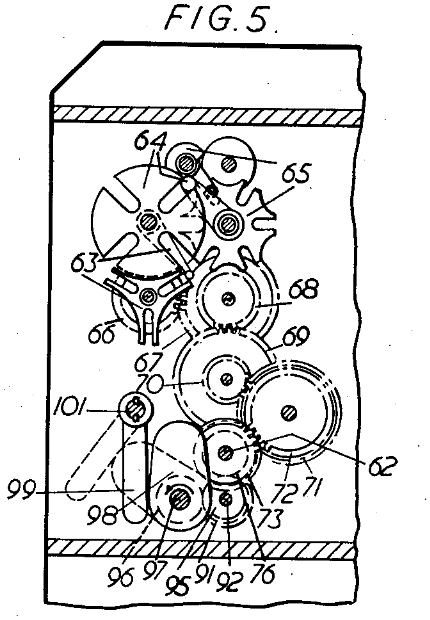
FIG. 5 is a sectional view along the line V—V of FIG. 4.

The resetting mechanism 12 for the punch-actuating wheels 6 and the time wheel 48 comprises a train of gear wheels 55, 56, 57 and 58 which are shown in FIG. 4 and of which the gear wheel 55 is fixed to the splined shaft 53 so as to rotate once per minute. Gear wheels 55, 56, 57 and 58 are so chosen that a shaft 61 on which gear wheel 58 is fixed rotates once in ten minutes, that is to say performs 1008 rotations per week. Shaft 61 is coupled to a shaft 62 by three Geneva mechanisms 63, 64 and 65, and gear wheels 66, 67, 68, 69, 70, 71, 72 and 73 (see also FIG. 5). Gear wheel 73 is fixed to the shaft 62 and the gear relationships are so chosen that the shaft 62 performs one half of a revolution per week.

Figure 6:
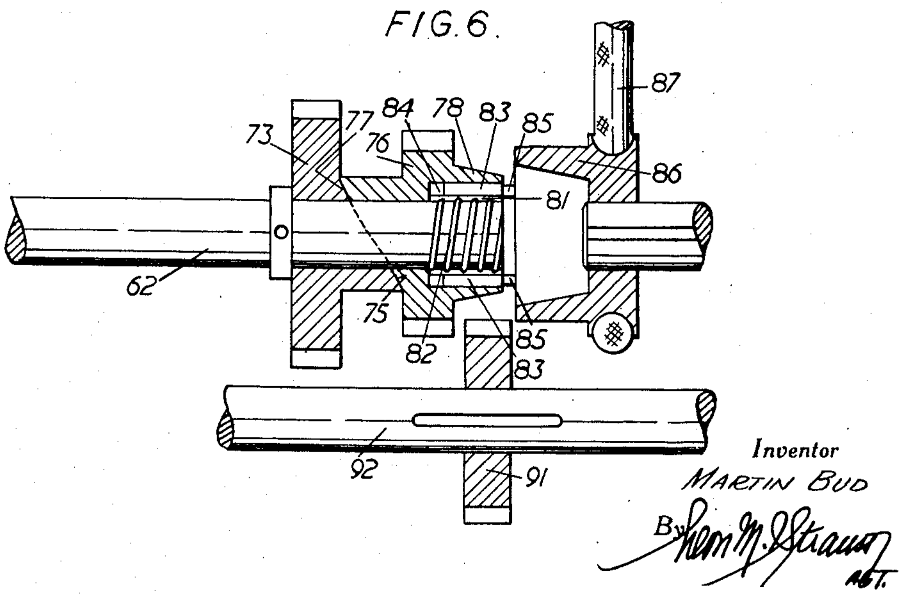
FIG. 6 is a part-sectional view, to a larger scale than FIG. 4 showing a detail of FIG. 4.

Gear wheel 73, as can be seen in the enlarged view of FIG. 6, has a cam formation 75 formed on one of its faces. Mounted alongside gear wheel 73 on the shaft 62 is a gear wheel 76 which on one of its faces has a cam formation 77 and on the other of its faces is provided with a male part 78 of a cone clutch. The gear wheel 76 has a bore 81 housing a spring 82 serving to urge the gear wheel 76 towards the gear wheel 73, so as to normally maintain the cam formations 75 and 77 in engagement with each other. From the bore 81 the gear wheel 76 has two keyways 83 extending parallel to the axis of the gear wheel at diametrically opposite points in the bore, and, running from the keyways 83, a keyway 84 extending in an annular manner at the base of the bore. Two diametrically opposite keys 85 provided on the shaft 62 normally engage in the keyways 83 or in the keyway 84.

As the gear wheel 73 rotates, the cam formation 75, by acting on the cam formation 77, pushes the gear wheel 76 against the action of the spring 82, keyways 83 sliding over the keys 85. At the end of one week the gear wheel 76 will have been pushed to such a position that the keys 85 lie in the keyway 84, the male part 78 of the cone clutch engaging at this time a female part 86. As the gear wheel 73 then continues to rotate, the gear wheel 76 cannot return until it has performed half a revolution, due to the engagement of the keys 85 in the annular keyway 84. Gear wheel 76 is thus rotated by the cone clutch, the female part 86 thereof being driven by a belt 87 which in turn is driven by the shaft 53. A gear wheel 91 mounted on a shaft 92 is so positioned that when the cone clutch 78, 86 is engaged, the gear wheel 91 is engaged by the gear wheel 76. Gear wheel 91 has half as many teeth as the gear wheel 76 so that, while the gear wheel 76 performs half a revolution before disengaging the cone clutch 78, 86, the gear wheel 91 performs a complete revolution. At this point the keys 85 lie in line with the keyways 83 and the cone clutch is disengaged by the spring 82 and the shaft 92 has thus been caused to perform one revolution, over a period of half a minute, every 10,080 minutes, that is to say at the end of each week.

The shaft 92 (see FIG. 4) carries two cams 93 which, on rotating, allows the ten-transfer mechanisms 46 and 47 to be drawn out of engagement with the punch-actuating wheels 6 and the time wheel 48 by springs 94. The shaft 92 also carries a gear wheel 95 (see also FIG. 5) meshing with a gear wheel 96 mounted on a shaft 97 to which a lever 98 is fixed. Lever 98 engages a lever 99 fixed to a shaft 101. Six resetting pawls 102 are fixed to the shaft 101 (see FIG. 3), the pawls 102 co-operating with heater-shaped cams 103 which can be seen in FIGS. 2, 3 and 4, provided on the punch-actuating wheels 6 and the time wheel 48, in a manner known per se from step-by-step digital counting mechanisms for resetting the wheels.

The lever 18 for moving the segments 13 towards the punch-actuating wheels 6 is keyed to a spindle 104 carried by the casing 1. The spindle 104 carries a gear wheel 105 which meshes with two idler wheels 106 which are shown in FIG. 2. Each idler wheel 106 meshes with a gear wheel 107, the gear wheels 107 being fixed to shafts 108 which extend in recesses 109 between the supports 36 and 37. The shafts 108 each carry two cams 111. When by rotating the lever 18 the cams 111 are rotated through 90° the two supports 36 and 37 are forced away from each other against the action of the springs 38, towards the guide means 4. The two sets of gear wheels 23 and 24 are disengaged from each other, but both are held in their manually set position by the action of the detent balls 26 and 31 so as to ensure re-engagement of the two sets of gear wheels. The support 37, which can be seen in FIGS. 2 and 3, presses through the springs 38 against a block 112 connected to the guide means 4 and displaces the guide means 4 in turn towards the punch-actuating wheels 6. Movement of the guide means 4 towards the punch-actuating wheels 6 is resisted by springs 113, which are shown in FIG. 3, so that the projections 39 of the segments 13 which correspond to a manually pre-set number strike the corresponding punches 41 in the adjacent guide means 4, which in co-operation with the dies 43 in the guide means 4 at the other side of the pathway 3 punch holes into the record card, if previously inserted through the slot 2 of the casing 1 into the pathway 3, the punched holes corresponding to the manually set number. At the same time, due to the displacement of the guide means 4 bodily against the action of the springs 113 towards the punch-actuating wheels 6, the projections 45 of the punch-actuating wheels 6 which correspond to the time of operating the lever 18 strike the corresponding punches 7 in the now adjacent guide means 4, which in cooperation with the dies 54 in the opposite guide means 4 punch holes into the record card, these holes corresponding to the time to which the punch-actuating wheels 6 are automatically set by the clock mechanism 11. It will be seen that the punches 7 and the punches 41 act on the punch card from opposite sides thereof, the punches 7 and 41 being at the extreme of their operating movement when the support 37 contacts the block 112 and the guide means 4 has been moved to its extreme position of proximity to the punch-actuating wheels 6 as defined by abutment stops 118, shown in FIG. 3, in which the springs 113 are seated. On release of the lever 18, the arrangement is returned into its initial position by spring action.

By operating the lever 21 the punch-actuating wheels 6 are displaced from one position into a second position in a direction parallel to the pathway 3 and locked in this position by a detent 114 which is shown in FIGS. 2 and 4. The operative projections 45 of the punch-actuating wheels 6 now co-operate with a further set of punches 7 in the adjacent guide means 4 and dies 54 in the opposite guide means, the said further punches and dies 54 being analogous to those previously described so that depending on the position of the lever 21 the time markings are punched in either field A or field B of the record card which is shown in FIG. 8.

Figure 8:
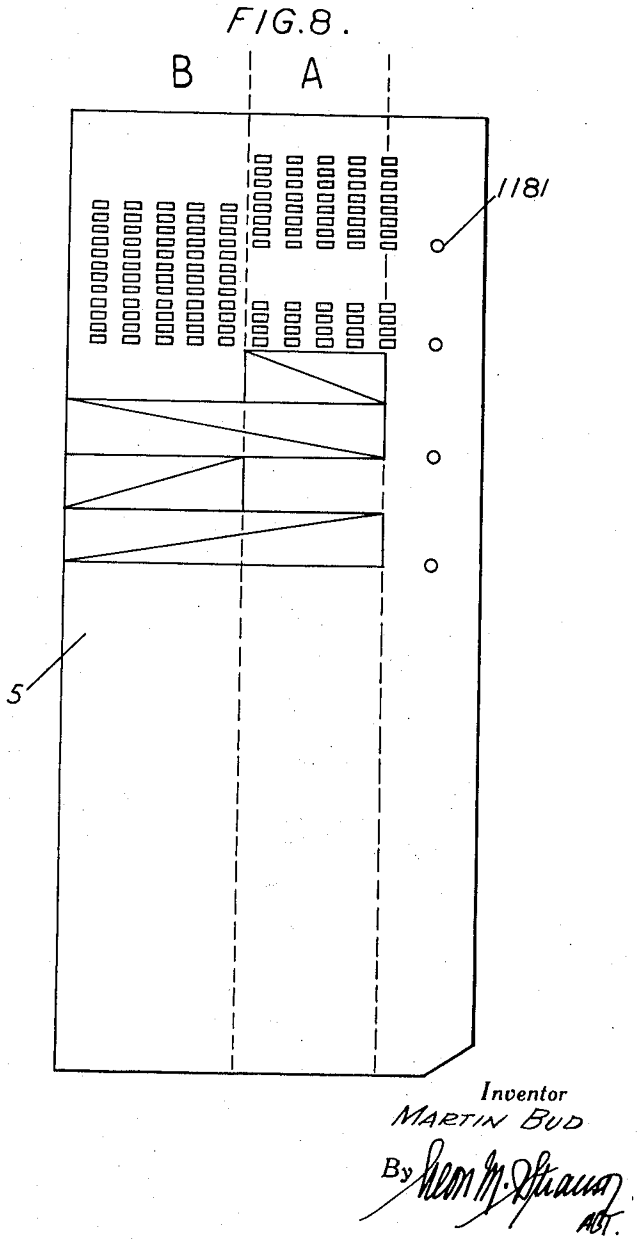
FIG. 8 illustrates a record card on which various punching operations have been performed.

Associated with the support 37, a single punch-actuating projection 115 which can be seen in FIG. 3 is provided positioned for engaging a single punch 116 which in co-operation with a die 117 in the guide means 4 punches a location hole 1181 in the record card 5 shown in FIG. 8.

An arrangement as described in the specification of my co-pending patent application Serial No. 827,962, filed July 17, 1959, is provided for locating the record card in the correct position for each successive punching operation on the card, making use of the location hole 1181 punched on each punching operation by the punch 116.

It should be clearly understood that the embodiment hereinbefore described wtih reference to the accompanying drawings is given by way of example only. Many modifications, omissions and additions are possible without departing from the spirit and scope of the invention.

I claim:

1. A recording device comprising means for positioning a record card relatively to the device, a first plurality of binary marking means, a first plurality of marking members operable by said binary marking means, said first plurality of marking members being arranged at one side of said positioning means for acting on said record card at one side thereof to mark the same within a first area, means for discontinuously and automatically setting said first plurality of marking means in dependence on a variation of a variable quantity, a second plurality of binary marking means, a second plurality of marking members operable by said second plurality of marking means, said second plurality of marking members being arranged at the other side of said positioning means at a level different from the level of the first plurality of marking members for acting on said record card at the other side thereof to mark the same within a second area, means for setting said second plurality of marking means independently of said automatic setting means, and means for jointly operating said first plurality and said second plurality of marking means to cause markings to be recorded in binary notation on said record card.

2. A device as claimed in claim 1, wherein the means for setting said second plurality of marking means are manually operable means.

3. A recording device comprising means for positioning a record card relatively to the device, a first plurality of punches arranged at one side of said positioning means, a first plurality of dies arranged at the other side of said positioning means for co-operation with said first plurality of punches, a first plurality of binary punch-actuating means, means for discontinuously and automatically setting said first plurality of punch-actuating means in dependence on a variation of a variable quantity, a second plurality of punches arranged at said other side of said positioning means, a second plurality of dies arranged at said one side of said positioning means for co-operation with said second plurality of punches, a second plurality of binary means for actuating said second plurality of punches, means for manually setting said second plurality of punch-actuating means, said first plurality of punches being arranged at a level different from the level of said second plurality of punches and means for jointly operating the said first plurality of punch-actuating means and said second plurality of punch-actuating means to cause punch holes to be punched by said first plurality of punches and said second plurality of punches at different levels on said record card.

4. A recording device as claimed in claim 3, and comprising guide means for constraining the punches of said first and second pluralities of punches to move within their respective levels.

5. A recording device as claimed in claim 3, wherein said means for operating said first plurality of punch-actuating means are provided at said one side of said positioning means, and said means for operating said second plurality of punch-actuating means are provided at said other side of said positioning means.

6. A recording device comprising means for positioning a record card relatively to the device, means for mounting said positioning means displaceably in a transverse direction, a first plurality of binary marking means arranged at one side of said positioning means for marking said record card from one side thereof within a first area, means for automatically setting said first plurality of marking means in dependence on a variation of a variable quantity, a second plurality of binary marking means arranged at the other side of said positioning means for marking said record card from the other side thereof within a second area different from said first area, means for setting said second plurality of marking means independently of said automatic setting means, means for displacing one of said pluralities of marking means towards said positioning means, and means arranged between said one plurality of marking means and said positioning means for transversely displacing said positioning means in the direction towards the other plurality of marking means for causing marking means of the first and second pluralities thereof to act jointly on said record card from opposite sides.

7. A recording device comprising means for positioning a record card relatively to the device, means for mounting said positioning means displaceably in transverse direction, a first plurality of punches arranged at one side of said positioning means, a first plurality of dies arranged at the other side of said positioning means for co-operation with said first plurality of punches, a first plurality of binary punch-actuating means, means for automatically setting said first plurality of punch-actuating means in dependence on a variation of a variable quantity, a second plurality of punches arranged at said other side of said positioning means, a second plurality of dies arranged at said one side of said positioning means for co-operation with said second plurality of punches, a second plurality of binary means for actuating said second plurality of punches, means for setting said second plurality of punch-actuating means independently of said automatic setting means, said first plurality of punches being arranged at a level different from the level of said second plurality of punches, means for displacing one of said pluralities of punch-actuating means in the direction towards said positioning means to actuate punches and to force the same into the co-operating dies, and means for transversely displacing said positioning means bodily with said one plurality of punch-actuating means during a part of their movement of displacement to force other dies to engage co-operating punches held stationary by their punch-actuating means.

8. A recording device as claimed in claim 7, wherein said one plurality of punch-actuating means is the said second plurality of punch-actuating means.

References Cited in the file of this patent

UNITED STATES PATENTS

| | | |
|---|---|---|
| 623,569 | Sedgwick | Apr. 25, 1899 |
| 927,805 | Lake | July 13, 1909 |
| 1,219,765 | Peirce | Mar. 20, 1917 |
| 2,421,697 | Hobby | June 3, 1947 |
| 2,540,033 | Leathers | Jan. 30, 1951 |
| 2,922,687 | Cooper et al. | Jan. 26, 1960 |

FOREIGN PATENTS

| | | |
|---|---|---|
| 819,602 | Great Britain | Sept. 9, 1959 |